(No Model.) 2 Sheets—Sheet 2.
J. T. MEATS.
CARDING MACHINE.
No. 579,117. Patented Mar. 16, 1897.
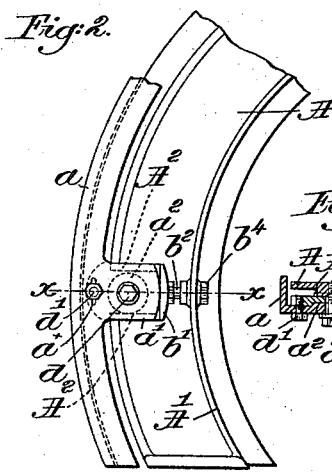
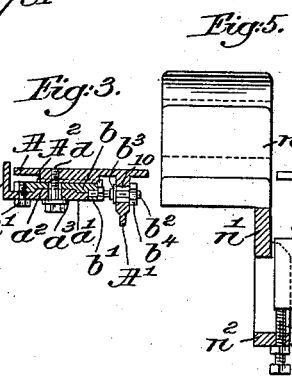
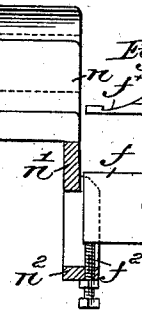
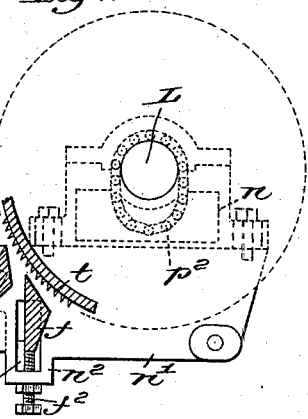
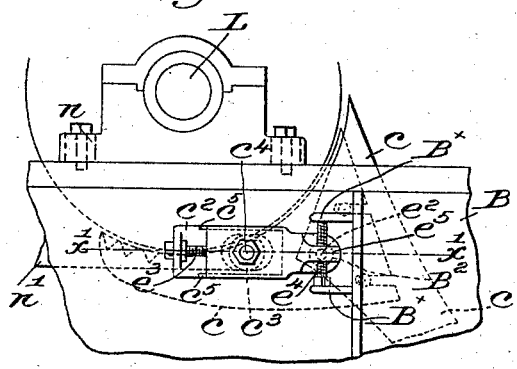
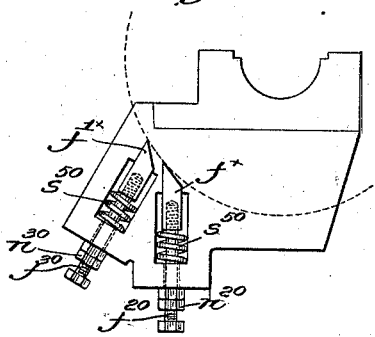
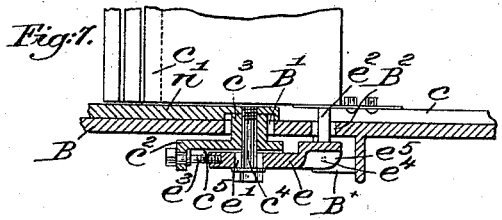
Witnesses.
Fred S. Greenleaf
Thomas J. Drummond
Inventor.
John T. Meats.
By Crosby & Gregory
Attys.

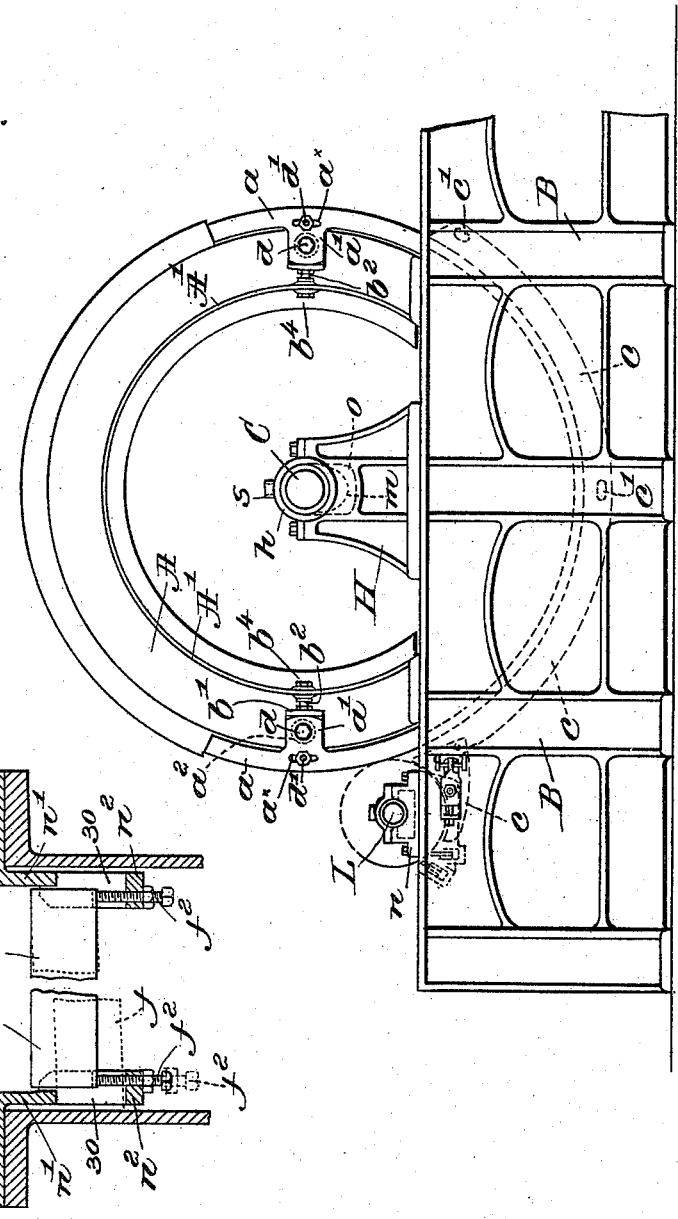

UNITED STATES PATENT OFFICE.

JOHN T. MEATS, OF TAUNTON, MASSACHUSETTS, ASSIGNOR TO THE MASON MACHINE WORKS, OF SAME PLACE.

CARDING-MACHINE.

SPECIFICATION forming part of Letters Patent No. 579,117, dated March 16, 1897.

Application filed December 2, 1895. Serial No. 570,774. (No model.)

*To all whom it may concern:*

Be it known that I, JOHN T. MEATS, of Taunton, county of Bristol, State of Massachusetts, have invented an Improvement in Carding-Machines, of which the following description, in connection with the accompanying drawings, is a specification, like letters and figures on the drawings representing like parts.

This invention relates to machines for carding fibrous material, and has for its object the production of a novel and simple construction and adjustment of the casing-supports and mote-knives, whereby greatly-increased efficiency and range of adjustment are attained.

So far as I am aware it has heretofore been the practice to construct each casing-support with two or more bearings, so that the casings could not be positively adjusted at one point, or if only one bearing is used with adjustment in one direction only.

By my invention herein to be described the radial adjustment can be made at one point without disturbing the circumferential adjustment, or vice versa, and by means of these simpler and more positive adjustments (which must be made as the wire on the cylinder wears and is ground down) I obtain much greater efficiency from the machine.

Figure 1, in side elevation, represents a sufficient portion of the card-frame to be understood with my invention applied thereto. Fig. 2 is an enlarged side view of part of one of the cylinder-casings. Fig. 3 is a transverse sectional view thereof on the line $x\,x$, Fig. 2. Fig. 4 is an enlarged view of the licker-in bearing, partially in dotted lines and with the mote-knives in section. Fig. 5 is an end view of the licker-in bearing with part of a mote-knife and its adjusting-screw in elevation, the supporting apron or plate being shown integral with the bearing and in section. Fig. $5^a$ is a top view of one end of a mote-knife to be described. Fig. 6, in side elevation, represents the under-casing-adjusting devices relatively to the licker-in bearing; and Fig. 7 is a partial horizontal sectional view thereof on the line $x'\,x'$, Fig. 6. Fig. 8 is a detail view showing a yielding support for the mote-knives; and Fig. 9 is a transverse section, centrally broken out, showing the manner of inserting or removing the mote-knife.

Referring to Figs. 1, 2, and 3, the casing-supports $a$, to which the usual sheet-iron castings, extending across the card-cylinder in close proximity to the wire, are secured in usual manner, are provided each with an inwardly-extended radial ear or lug $a'$, having on its inner side a hub or boss $a^2$ to enter a corresponding-shaped recess in the carrying-plate $b$, forming a bearing for circumferential adjustment of the casing-support $a$ about the stud-bolt $d$ as a center. A set-screw $d'$, extended through a slot $a^\times$ in the ear or lug $a'$ into the plate $b$, retains the casing-support in circumferential adjustment, and the bolt $d$ is extended through elongated slots $a^3$ in the carrying-plate and lug $a'$, as shown in Fig. 3, into the arch A, the slots permitting radial adjustment of the casing-support $a$.

The carrying-plate $b$ is upturned or flanged at $b'$ to receive one end of a threaded stud or bolt $b^2$, extended through an opening 10 in the arch-flange A', (see Fig. 3,) and set-nuts $b^3\,b^4$ on the stud, on opposite sides of said flange, regulate the radial adjustment of the casing-support, the bolt $d$ being loosened for such adjustment.

Ribs or flanges $A^2$ (see dotted lines, Figs. 2 and 3) on the arch-frame A receive and guide the carrying-plate $b$ in the radial adjustment of the carrying support, and from the foregoing it will be obvious that radial or circumferential adjustment of the casing-supports can be made the one without interfering with the other.

The under casings, sometimes called "screens," are shown by dotted lines in Figs. 1 and 6 at $c$, and they are adjusted at the points $c'$ in usual manner and not necessary to be described herein in detail; but I have devised means for adjusting the screen or casing $c$ with or independently of the licker-in bearing $n$.

An apron or plate $n'$ forms part of the licker-in bearing and extends downward inside of the end frame B, and a guide-block $c^2$ is provided with a boss $c^3$, extended loosely through an opening B' in the frame B, said block being attached to the apron $n'$ of the licker-in bearing by an adjusting-bolt $c^4$.

Longitudinal ribs $c^5$ on the guide-block $c^2$ enter suitable undercut portions on a supporting-plate $e$, slotted at $e'$ to receive the bolt $c^4$ and provided at one end with a lug $e^2$, extended through an opening $B^2$ in the end frame, to which lug the casing or screen $c$ is secured.

An adjusting-screw $e^3$ is rotatably held in the upturned end of the guide-block $c^2$ and enters the supporting-plate $e$ to move it longitudinally on said block when the bolt $c^4$ is loosened, to thereby adjust the screen $c$ longitudinally independently of the licker-in bearing.

By means of a vertical adjusting-screw $e^4$, passed through an ear $e^5$ of the plate $e$ and resting on projections $B^\times$ of the frame, the end of the casing $c$ may be adjusted vertically. If, however, the bolt $c^4$ is tightened to secure the guide-block $c^2$ and supporting-plate $e$ to the apron or plate $n'$ of the licker-in bearing $n$, adjustment of the latter will adjust the end of the screen $c$ simultaneously therewith.

Adjustment of the licker-in bearing is effected by the usual means. (Not shown herein to avoid confusion in the drawings.)

Referring to Figs. 4 and 5, the aprons $n'$ of the licker-in bearings are shown as provided with housings $n^2$ $n^3$ for the mote-knives $f f'$, which are adapted to be adjusted independently of the licker-in bearing by set-screws $f^2$ $f^3$ toward or from the teeth $t$, partially shown in Fig. 4.

If yielding supports for the knives are desired, suitable springs $s^{50}$ (see Fig. 8) may be inserted between the backs of the knives $f^\times f'^\times$ and the housing, the adjusting-screws $f^{20}$ $f^{30}$ being provided with check-nuts $n^{20}$ $n^{30}$ to limit the extent of inward movement of the knives.

The licker-in box is expensive and rather difficult to replace, and in order to prevent breakage thereof by an obstruction between the mote-knives and the licker-in I have reduced the knives in thickness, as at $f^\times$, Fig. 5$^a$, so that the occurrence of an obstruction will break the knife or knives rather than the licker-in box, the knives being readily replaced.

Referring to Fig. 9, I have shown more clearly the construction by means of which the mote-knives may be more readily inserted or removed, one of the knives, as $f$, and its housings $n^2$ being shown. The slots 30 in the housings are of such depth and width that by lowering one or the other of the set-screws $f^2$, as shown in dotted lines at the left, Fig. 9, the end of the knife may be moved endwise into the slot of the housing, so that by taking hold of its other end the knife can be easily removed, the reverse operation serving to readily replace it.

Having described one embodiment of my invention, what I claim, and desire to secure by Letters Patent, is—

1. In a carding-machine, the main frame, a casing-support mounted thereon, means to adjust said support radially, and independent means to adjust said support circumferentially, substantially as described.

2. In a carding-machine, the main frame, a casing-support pivotally mounted thereon, means to adjust said support circumferentially, and independent means to move the casing radially relative to its pivot, substantially as described.

3. In a carding-machine, the main frame, a bearing-plate radially adjustable thereon, a casing-support pivotally mounted on the bearing-plate, and means to circumferentially adjust said casing-support, substantially as described.

4. In a carding-machine, the main frame, a slotted bearing-plate radially movable thereon, means to adjust it, a casing-support mounted to rock on said plate, a clamping-bolt extended through the fulcrum of said support and bearing-plate into the main frame, and means to adjust the casing-support circumferentially, substantially as described.

5. In a carding-machine, the licker-in bearing having a housing for the mote-knife, slotted in its side to receive the end of the knife, the length of the slot being equal to the width of the knife, and an adjustable supporting-screw to normally support the knife end above the slot to prevent entrance of the knife end thereinto, substantially as described.

6. In a carding-machine, the licker-in bearing having a downturned portion, a guide-block pivotally mounted thereon, the under-casing, a support therefor longitudinally movable on said block, a clamping-bolt forming the fulcrum for the guide-block and to clamp it and the support to the licker-in bearing, and means carried by the guide-block to adjust the support longitudinally thereon when unclamped, substantially as described.

7. In a carding-machine, the licker-in bearing having a downturned portion, a guide-block pivotally mounted thereon, the under-casing, a slotted support therefor, longitudinally movable on said block, a clamping-bolt extended through the slot of the support and to clamp it to the licker-in bearing, and means carried by the guide-block to adjust the support longitudinally thereon when unclamped, combined with means carried by said support to adjust the undercasing vertically, substantially as described.

8. In a carding-machine, the licker-in bearing, a housing carried thereby for the mote-knife, and a mote-knife weakened at or near its end, as and for the purpose described.

9. In a carding-machine, the licker-in bearing having a housing for the mote-knife, a yielding support for the knife, and an adjusting-screw to limit the upward movement of the knife, substantially as described.

In testimony whereof I have signed my name to this specification in the presence of two subscribing witnesses.

JOHN T. MEATS.

Witnesses:
JOHN C. EDWARDS,
AUGUSTA E. DEAN.